United States Patent [19]

Nakamura et al.

[11] 4,125,502
[45] Nov. 14, 1978

[54] POLYVINYL ACETATE-MODIFIED PHENOLIC RESIN COMPOSITION

[75] Inventors: Nobutaka Nakamura; Yukio Saeki, both of Fujieda, Japan

[73] Assignee: Sumitomo Durez Company, Ltd., Tokyo, Japan

[21] Appl. No.: 644,996

[22] Filed: Dec. 29, 1975

[30] Foreign Application Priority Data

Dec. 26, 1974 [JP] Japan .................... 50-148453

[51] Int. Cl.$^2$ ............................ C08L 61/10
[52] U.S. Cl. .................... 260/29.3; 260/17.2; 260/17.4 SG; 260/29.4 UA; 260/29.6 NR; 260/29.6 BE; 260/33.4 R; 260/844; 156/327; 156/335
[58] Field of Search ............ 260/33.4 R, 17.4 SG, 260/17.2, 844, 29.3; 156/327, 335

[56] References Cited

U.S. PATENT DOCUMENTS

| | | | |
|---|---|---|---|
| 3,267,174 | 8/1966 | Fry et al. ........................ | 260/848 |
| 3,352,806 | 11/1967 | Hicks ........................ | 260/29.4 UA |
| 3,600,353 | 8/1971 | Baker ........................ | 260/844 X |
| 3,607,598 | 9/1971 | Le Blanc et al. ........................ | 260/844 X |
| 3,617,429 | 11/1971 | Le Blanc ........................ | 260/844 X |
| 3,681,168 | 8/1972 | Baker ........................ | 156/335 X |
| 3,778,399 | 12/1973 | Fazioli et al. ........................ | 260/29.6 ME |
| 3,843,576 | 10/1974 | Parkinson ........................ | 156/335 X |
| 3,897,589 | 7/1975 | Meier ........................ | 156/335 X |
| 4,073,761 | 2/1978 | Bowman et al. ........................ | 260/29.3 |

FOREIGN PATENT DOCUMENTS

| | | | |
|---|---|---|---|
| 599,808 | 6/1960 | Canada ........................ | 260/29.3 |
| 478,988 | 1/1938 | United Kingdom. | |

OTHER PUBLICATIONS

Du Pont Publication, Pentamethylene Glycol, in Du Pont Electrochemicals 26, No. 2 (Jan. 12, 1948).
Chem. Abs. 70:P39084a; 74:P88494a; 74:P13803s; 69:P52792d; 70:P12342w.
D. F. Gould, Phenolic Resins (Reinhold, 1959) pp. 4, 90, 100.

Primary Examiner—Thomas De Benedictis, Sr.
Attorney, Agent, or Firm—Peter F. Casella; James F. Mudd; William G. Gosz

[57] ABSTRACT

Adhesive compositions comprising a mixture of polyvinyl acetate and an alcohol soluble resol phenolic resin and about 2 to 20 parts by weight of lower polyhydric alcohol per 100 parts by weight of the resin solids have enhanced binding strengths on curing even after a prolonged open assembly time.

7 Claims, No Drawings

POLYVINYL ACETATE-MODIFIED PHENOLIC RESIN COMPOSITION

BACKGROUND OF THE INVENTION

This invention relates to a polyvinyl acetate-modified phenolic resin composition having improved adhesion.

Polyvinyl acetate-modified phenolic resin is a thermosetting resin obtained by admixing an alcohol-soluble phenolic resin of the resol type with a polyvinyl acetate resin, and is characterized by properties different from those of alcohol-soluble resol type phenolic resin and of the vinyl acetate resin. Alcohol soluble resol resins (typified by resol resins soluble in lower monohydric alcohols such as methanol) are more particularly described in D. F. Gould "Phenolic Resins" Reinhold Publishing Corporation 1959, Chapter 3, the pertinent disclosure of which is incorporated herein by reference. Mixtures of phenolic resins and polyvinyl acetate are disclosed by Gould op cit page 95, lines 26-29. More specifically the polyvinyl-acetate modified phenolic resin is an advantageous adhesive in that it can meet the higher adhesive durability standard required in the specification of Type I plywood of JAS (Japanese Agricultural Standards) which is difficult to achieve with vinyl acetate resins. It is also advantageous in that the applicators and related equipment used with the resin mixture are washable with water, which advantage is not realizable in the case of alcohol-soluble resol type phenolic resins.

Adhesive compositions are prepared from such resins by the addition, directly before use, of a strongly acidic hardener such as benzenesulfonic acid or para-toluenesulfonic acid (used in sufficient proportion in the adhesive composition to impart a pH of about 0.1 to about 1.0 to the adhesive composition) which is applied onto the adherend. The resin-containing adherends are pressed under a pressure of about 2–15 kg/cm$^2$ for about 5–20 hours at 15°–40° C. to cure the resin, thereby completing the adhesion. However, in comparison with alcohol-soluble resol type phenolic resins or vinyl acetate resins, the polyvinyl acetate-modified phenolic resins generally have a serious drawback in showing a significant loss in bonding strength when the socalled open assembly time, or the period between the coating of adhesive composition on the adherend and curing of the resin is long i.e. about 10 minutes or longer. The necessity of limiting open assembly time in using conventional polyvinyl acetate-modified phenolic resin compositions inevitably necessitates rapid processing in wood working plants, and eventually leads to defective adhesion of the resin product, particularly at high ambient temperatures.

This phenomenon can be ascribed to an insufficient flow of the adhesive composition when compressed after a prolonged open assembly time, and an insufficient bonding strength resulting therefrom due to the faster hardening speed of such an adhesive composition in comparison with that of ordinary alcohol-soluble resol type phenolic resins or of vinyl acetate resins, as the adhesive composition of polyvinyl acetate-modified phenolic resin containing a hardener already starts hardening on the adherend at normally encountered temperatures above 15° C., and as the vinyl acetate resin used as its modifier is originally provided with a relatively fast drying speed.

SUMMARY OF THE INVENTION

It is now found that a sufficiently high bonding strength can be obtained even after a prolonged open assembly time by the addition of a saturated aliphatic polyhydric alcohol of 2 to 6 carbon atoms and 2 to 6 alcoholic hydroxy groups per molecule in an amount of about 2 to about 20 parts by weight to 100 parts by weight of polyvinyl acetate-modified phenolic resin solid. This may be ascribed to a suitable flow being retained by the plasticizing effect of polyhydric alcohol even after the adhesive composition of polyvinyl acetate-modified phenolic resin coated on the adherend hardens when compressed as explained above.

DETAILED DESCRIPTION OF THE INVENTION

The amount of polyhydric alcohol is preferably within a range of about 2 to about 20 parts by weight with respect to 100 parts by weight of polyvinyl acetate-modified phenolic resin solid. An addition in excess of this range results in reduced bonding strength due to an excessive plasticizing effect.

Generally the mixture of polyvinyl acetate and resol-type phenolic resin contains a weight ratio of vinyl acetate polymer to phenolic resin of from about 9:1 to about 1:1.

Lower polyhydric aliphatic alcohols for use in the present invention are exemplified by ethylene glycol, propylene glycol, glycerine, diglycerine, sorbitol, etc. Mixtures of these and equivalent polyhydric alcohols can also be used. The present invention is further illustrated by the following examples, which shall not be construed as limiting the scope of this invention. In these examples parts percentages and proportions are by weight unless otherwise specified.

EXAMPLE 1

(1) Addition to ethylene glycol to polyvinyl acetate-modified phenolic resin

Adhesive compositions were prepared by the addition, to 100 parts of a polyvinyl acetate-modified phenolic resin (a mixture of an aqueous emulsion of vinyl acetate homopolymer and methanolic resol-type phenol-formaldehyde resin having a resin solids content of 60%), of 0, 2, 6, 10, 14 and 18 parts of ethylene glycol and then 5 parts of hardener (50% aqueous benzenesulfonic acid solution).

(2) Adhesion of wood

Wood samples were bonded with the above-mentioned adhesive compositions under the following conditions. The compressive shear bonding strengths obtained are summarized in the following Table 1.

| | |
|---|---|
| Adherend | white fir |
| Moisture content | 10 – 20 % |
| Coating amount | 250 g/m$^2$ (coated on one side) |
| Open assembly time | 20 minutes at 20° C |
| Closed assembly time | 1 minute at 20° C |
| Compression | Temperature 20° C |
| | Pressure 8 kg/cm$^2$ |
| | Time 20 hours |
| Conditioning after removal of pressure | 24 hours at 20° C |

Table 1

Compressive shear bonding strength
(according to JIS-K-6802-1973)

Composition

Table 1-continued

Compressive shear bonding strength
(according to JIS-K-6802-1973)

| | | | | | | |
|---|---|---|---|---|---|---|
| Polyvinyl acetate-modified phenolic resin (parts) | 100 | 100 | 100 | 100 | 100 | 100 |
| Ethylene glycol (parts) | 0 | 2 | 6 | 10 | 14 | 18 |
| Hardener (parts) | 5 | 5 | 5 | 5 | 5 | 5 |
| Amount of ethylene glycol with respect to 100 parts of polyvinyl acetate-modified phenolic resin solid (parts) | 0 | 3.3 | 10 | 17 | 23 | 30 |
| Compressive shear bonding strength | | | | | | |
| Bonding strength in normal state (kg/cm$^2$) | 11.5 | 49.5 | 58.2 | 53.2 | 46.5 | 38.5 |
| Wood failure in normal state (%) | 0 | 61 | 71 | 85 | 58 | 25 |
| Bonding strength after repeated boiling (kg/cm$^2$) | peeled | 18.3 | 21.5 | 23.2 | 17.3 | 15.6 |
| Wood failure after repeated boiling (%) | peeled | 29 | 60 | 70 | 25 | 18 |

As shown in Table 1, the adhesive composition containing 3.3, 10 and 17 parts of ethylene glycol with respect to 100 parts of polyvinyl acetate-modified phenolic resin solid showed higher bonding strengths than in the other compositions.

EXAMPLE 2

(1) Addition of sorbitol to polyvinyl acetate-modified phenolic resin

Adhesive compositions were prepared by the addition, to 100 parts of polyvinyl acetate-modified phenolic resin (resin solid content 60%), of 0, 4, 8, 12, 16 and 20 parts of 70% aqueous sorbitol solution, and then of 5 parts of hardener (50% aqueous paratoluenesulfonic acid solution).

(2) Adhesion of wood

The wood samples were bonded with the above-mentioned adhesive composition under the following conditions. The compressive shear bonding strengths of the bonded samples are summarized in the following Table 2.

| | |
|---|---|
| Adherend | birch |
| Moisture content | 8 – 12 % |
| Coating amount | 250 g/m$^2$ (coated on one side) |
| Open assembly time | 20 minutes at 25° C |
| Closed assembly time | 1 minute at 25° C |
| Compression | Temperature 25° C |
| | Pressure 12 kg/cm$^2$ |
| | Time 20 hours |
| Conditioning after removal of pressure | 24 hours at 25° C |

Table 2

Compressive shear bonding strength
(according to JIS-K-6802-1973)

| Composition | | | | | | |
|---|---|---|---|---|---|---|
| Polyvinyl acetate-modified phenolic resin (parts) | 100 | 100 | 100 | 100 | 100 | 100 |
| 70% Aqueous sorbitol solution (parts) | 0 | 4 | 8 | 12 | 16 | 20 |
| Hardener (parts) | 5 | 5 | 5 | 5 | 5 | 5 |
| Amount of sorbitol with respect to 100 parts of polyvinyl acetate-modified phenolic resin solid (parts) | 0 | 4.7 | 9.3 | 14 | 18.7 | 23.3 |
| Compressive shear bonding strength | | | | | | |
| Bonding strength in normal state (kg/cm$^2$) | 52.0 | 105 | 143 | 153 | 140 | 95.3 |
| Wood failure in normal state (%) | 0 | 22 | 40 | 38 | 28 | 11 |
| Bonding strength after repeated boiling (kg/cm$^2$) | peeled | 18.2 | 48.5 | 52.3 | 31.6 | 12.3 |
| Wood failure after repeated boiling (%) | peeled | 11 | 35 | 37 | 15 | 3 |

As shown in Table 2, the adhesive compositions containing 4.7, 9.3, 14 and 18.7 parts of sorbitol with respect to 100 parts of polyvinyl acetate-modified phenolic resin solid showed higher strengths than in the other compositions.

EXAMPLE 3

(1) Addition of glycerine to polyvinyl acetate-modified phenolic resin

Adhesive compositions were prepared by the addition, to 100 parts of polyvinyl acetate-modified phenolic resin (resin solid content 60%), of 0 and 6 parts of glycerine and then of 5 parts of hardener (50% aqueous paratoluenesulfonic acid solution).

(2) Adhesion of wood

Wood samples were bonded with the above-mentioned adhesive compositions under the following conditions. The compressive shear bonding strength of these bonded samples are summarized in the following Table 3.

| | |
|---|---|
| Adherend | Japanese cypress |
| Moisture content | 10 – 12 % |
| Coating amount | 250 g/m$^2$ (coated on one side) |
| Open assembly time | 5, 10, 20 or 40 minutes at 20° C |
| Closed assembly time | 1 minute at 20° C |
| Compression | Temperature 20° C |
| | Pressure 10 kg/cm$^2$ |
| | Time 20 hours |
| Conditioning after removal of pressure | 24 hours at 20° C |

Table 3

Compressive shear bonding strength
(according to JIS-K-6802-1973)

| Composition | | |
|---|---|---|
| Polyvinyl acetate-modified phenolic resin (parts) | 100 | 100 |
| Glycerine (parts) | 0 | 6 |
| Hardener (parts) | 5 | 5 |
| Amount of glycerine with respect to 100 parts of polyvinyl acetate-modified phenolic resin solid (parts) | 0 | 10 |
| | (Without Polyhydric Alcohol) | (With Polyhydric Alcohol) |

Table 3-continued

| Open assembly time (minute) | Compressive shear bonding strength (according to JIS-K-6802-1973) | | | | | | | |
|---|---|---|---|---|---|---|---|---|
| | 5 | 10 | 20 | 40 | 5 | 10 | 20 | 40 |
| Compressive shear bonding strength | | | | | | | | |
| Bonding strength in normal state (kg/cm$^2$) | 79.3 | 63.2 | 21.5 | peeled | 61.5 | 68.5 | 75.3 | 69.4 |
| Wood failure in normal state (%) | 86 | 28 | 0 | peeled | 63 | 71 | 83 | 75 |
| Bonding strength after repeated boiling (kg/cm$^2$) | 38.5 | 28.9 | peeled | peeled | 35.2 | 39.2 | 38.9 | 37.6 |
| Wood failure after repeated boiling (%) | 68 | 25 | peeled | peeled | 58 | 67 | 70 | 65 |

As shown in Table 3, the adhesive composition containing 10 parts of glycerine with respect to 100 parts of polyvinyl acetate-modified phenolic resin solid showed higher bonding strengths for an open assembly time of about 10 minutes or longer in comparison with the adhesive composition with no addition of glycerine.

What is claimed is:

1. In an aqueous polyvinyl acetate-modified thermosetting resol phenolic resin adhesive composition wherein the weight ratio of polyvinyl acetate to resol resin is about 9:1 to about 1:1, the improvement wherein the composition comprises about 2 to about 20 parts per 100 parts by weight of the polyvinyl acetate modified phenolic resin solids of a lower saturated aliphatic polyhydric alcohol having 2 to 6 alcoholic hydroxy groups per molecule.

2. The composition as claimed in claim 1 wherein the phenolic resin is a phenol-formaldehyde resin.

3. The composition as claimed in claim 2 having a pH of about 0.1 to about 1.

4. The composition as claimed in claim 3 wherein the lower saturated polyhydric alcohol is selected from the group consisting of ethylene glycol, propylene glycol, glycerine, diglycerine, sorbitol and mixtures thereof.

5. The composition as claimed in claim 4 wherein the acid hardening agent is aqueous benzene sulfonic and the polyhydric alcohol is ethylene glycol.

6. The composition as claimed in claim 4 wherein the acid hardening agent is aqueous para-toluene sulfonic acid and the polyhydric alcohol is sorbitol.

7. The composition as claimed in claim 4 wherein the acid hardening agent is aqueous para-toluene sulfonic acid and the polyhydric alcohol is glycerine.

* * * * *